US010433352B2

(12) United States Patent
Cho et al.

(10) Patent No.: US 10,433,352 B2
(45) Date of Patent: Oct. 1, 2019

(54) OPERATION METHOD OF COMMUNICATION NODE SUPPORTING MOBILITY IN COMMUNICATION NETWORK

(71) Applicant: ELECTRONICS AND TELECOMMUNICATIONS RESEARCH INSTITUTE, Daejeon (KR)

(72) Inventors: Seung Kwon Cho, Daejeon (KR); Seok Ki Kim, Daejeon (KR); Won Ik Kim, Daejeon (KR); Eun Kyung Kim, Daejeon (KR); Jae Heung Kim, Daejeon (KR); Jae Su Song, Daejeon (KR); Sung Pil Shin, Daejeon (KR); Sei Yun Shin, Daejeon (KR); Mi Young Yun, Daejeon (KR); Soo Jung Jung, Daejeon (KR); Yun Hee Cho, Daejeon (KR); Tae Joong Kim, Daejeon (KR); Seung Kwon Baek, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/800,835

(22) Filed: Nov. 1, 2017

(65) Prior Publication Data
US 2018/0124859 A1 May 3, 2018

(30) Foreign Application Priority Data

Nov. 1, 2016 (KR) .......................... 10-2016-0144778
Oct. 27, 2017 (KR) .......................... 10-2017-0140870

(51) Int. Cl.
*H04W 76/12* (2018.01)
*H04W 28/02* (2009.01)
(Continued)

(52) U.S. Cl.
CPC ............. *H04W 76/12* (2018.02); *H04W 8/26* (2013.01); *H04W 28/021* (2013.01);
(Continued)

(58) Field of Classification Search
CPC ............. H04W 76/12; H04W 56/0025; H04W 40/246; H04W 28/021; H04W 8/26; H04W 84/18
See application file for complete search history.

(56) References Cited

U.S. PATENT DOCUMENTS 7,164,667 B2   1/2007  Rayment et al.
7,853,264 B1  12/2010  Oh
(Continued)

OTHER PUBLICATIONS

Paul Crane, "Towards 5G—an operators perspective Evolution or Revolution?" Presentation slides, WiMob, Oct. 2015.

*Primary Examiner* — Brian D Nguyen
(74) *Attorney, Agent, or Firm* — Rabin & Berdo, P.C.

(57) ABSTRACT

An operation method of a first communication node, which controls a plurality of communication nodes included in a mobile xhaul network supporting mobility, may comprise performing an attach procedure between the first communication node and a second communication node among the plurality of communication nodes; configuring a path for communications between the second communication node and a third communication node for which attach procedure has been completed among the plurality of communication nodes; and supporting communications of the second communication node and the third communication node using the configured path.

16 Claims, 16 Drawing Sheets

(51) Int. Cl.
*H04W 40/24* (2009.01)
*H04W 56/00* (2009.01)
*H04W 8/26* (2009.01)
*H04W 36/00* (2009.01)
H04W 84/18 (2009.01)
H04W 88/08 (2009.01)

(52) U.S. Cl.
CPC ..... *H04W 36/0009* (2018.08); *H04W 40/246* (2013.01); *H04W 56/0025* (2013.01); *H04W 84/18* (2013.01); *H04W 88/08* (2013.01)

(56) References Cited

U.S. PATENT DOCUMENTS

| | | |
|---|---|---|
| 8,565,150 B2 | 10/2013 | Hu et al. |
| 9,078,176 B2 | 7/2015 | Song et al. |
| 9,338,710 B2 | 5/2016 | Johansson et al. |
| 9,402,268 B2 | 7/2016 | Taori et al. |
| 9,560,531 B1 | 1/2017 | Chang et al. |
| 2007/0014573 A1* | 1/2007 | Wei ....................... H04B 10/27 398/59 |
| 2014/0321282 A1 | 10/2014 | Pragada et al. |
| 2016/0219475 A1 | 7/2016 | Kim |
| 2016/0242147 A1 | 8/2016 | Tarlazzi et al. |
| 2016/0255613 A1 | 9/2016 | Faerber et al. |
| 2017/0006499 A1 | 1/2017 | Hampel et al. |
| 2018/0054772 A1* | 2/2018 | Tan ....................... H04W 76/10 |
| 2018/0109303 A1* | 4/2018 | Yoo ..................... H04B 7/0695 |
| 2018/0234188 A1* | 8/2018 | Hisano ............... H04B 10/2575 |
| 2018/0287696 A1* | 10/2018 | Barbieri ............. H04B 7/15507 |

\* cited by examiner

MH3C STATES

MH2C STATES

OPERATION METHOD OF COMMUNICATION NODE SUPPORTING MOBILITY IN COMMUNICATION NETWORK

CROSS-REFERENCE TO RELATED APPLICATIONS

This application claims priorities to Korean Patent Applications No. 10-2016-0144778 filed on Nov. 1, 2016 and No. 10-2017-0140870 filed on Oct. 27, 2017 in the Korean Intellectual Property Office (KIPO), the entire contents of which are hereby incorporated by reference.

BACKGROUND

1. Technical Field

The present disclosure relates to an operation method of a communication node supporting mobility in a communication network, and more specifically, to an operation method of a communication node for supporting mobility in a communication network in which a fronthaul, a midhaul, and a backhaul are integrated.

2. Related Art

A communication network may include a core network (e.g., a mobility management entity (MME), a serving gateway (SGW), a packet data network (PDN) gateway (PGW), etc.), a base station (e.g., a macro base station, a small base station, a relay, etc.), a terminal, and the like. Communications between the base station and the terminal may be performed using various radio access technologies (RATs) such as 4G communication technology, 5G communication technology, wireless broadband technology (Wi-Bro), wireless local area network (WLAN) technology, wireless personal area network (WPAN) technology, etc.

In the communication network, the base station may be divided into a baseband unit (BBU) and a remote radio head (RRH) in a centralized RAN (C-RAN) structure. Here, the BBU and the RRH of the base station may be connected through a 'fronthaul' for which common public radio interface (CPRI) is a de facto standard. In a case that the function of the base station is divided into two parts, where the function division takes place between an upper part of the CPRI and a somewhere of a lower part of a packet data convergence protocol (PDCP) layer on a user plane, a 'midhaul' may be defined between the upper part of the CPRI and the lower part of the PDCP. Also, the base station may be connected to the core network via a wired 'backhaul' or a wireless 'backhaul'. For example, the base station may transmit data, control information, and the like received from the terminal to the core network through the wired backhaul or the wireless backhaul. The base station may also receive data, control information, and the like from the core network via the wired backhaul or the wireless backhaul.

In such the communication network, dedicated transport networks are used to perform communications through the fronthaul, the midhaul, and the backhaul. Accordingly, there is a problem that burden such as capital expenditures (CAPEX) and operating expenses (OPEX) is increased by using the dedicated transport networks for the fronthaul, the midhaul and the backhaul in the communication network. Also, since the dedicated transport network for each of the fronthaul, the midhaul, and the backhaul in the communication network usually uses wired transmission technologies, there are problems of large expenditure for constructing infrastructure and difficulties in getting installation spaces as compared with wireless transmission technologies. Also, some transport networks based on wireless transport do not support the mobility of communication networks and have limitations that they can not be utilized as a mobile wireless backhaul network when support of mobility is required, e.g., a backhaul for a base station in a train.

SUMMARY

Accordingly, embodiments of the present disclosure provide an operation method of a communication node for supporting mobility in a communication network in which a fronthaul, a midhaul, and a backhaul are integrated.

In order to achieve the objective of the present disclosure, an operation method of a first communication node for controlling a plurality of communication nodes included in a mobile xhaul network (MXN) supporting mobility may comprise performing an attach procedure between the first communication node and a second communication node among the plurality of communication nodes; configuring a path for communications between the second communication node and the third communication node; and supporting communications of the second communication node and the third communication node using the configured path.

The first communication node may perform a function of managing mobility of the plurality of communication nodes, a function of managing paths for communications of the plurality of communication nodes, and a function of managing resources for the plurality of communication nodes.

The first communication node may change a state of the second communication node from a deregistered state into a registered state when the attach procedure between the first communication node and the second communication node is completed. Also, the first communication node may allocate an identifier to the second communication node when the second communication node is in the registered state.

The first communication node may be connected to the plurality of communication nodes through H3 interfaces, and the plurality of communication nodes may be connected to each other through H2 interfaces. Also, the first communication node may perform communications with the plurality of communication nodes connected through the H3 interfaces based on an MXN H3 control (MH3C) protocol. Also, the second communication node may perform communication with at least one communication node connected to the second communication node through the H2 interfaces based on a MXH H2 control (MH2C) protocol.

In order to achieve the objective of the present disclosure, an operation method of a first communication node for controlling a plurality of communication nodes included in a mobile xhaul network (MXN) supporting mobility may comprise performing a discovery procedure for the plurality of communication nodes; establishing a link between the first communication node and a second communication node discovered through the discovery procedure; performing an attach procedure between the first communication node and a third communication node controlling the plurality of communication nodes; configuring a path for communications between the first communication node and a fourth communication node for which attach procedure has been completed among the plurality of communication nodes; and performing communications between the first communication node and the fourth communication node using the configured path.

The first communication node may obtain a first identifier of the second communication node and a sector identifier including a sector index for identifying a sector of the second communication node through the discovery procedure. Also, the first communication node may further obtain a beam index of a beam for the second communication node through the discovery procedure.

When the attach procedure between the first communication node and the third communication node is completed, a state of the first communication node may be changed from a deregistered state into a registered state. Also, a second identifier of the first communication node may be allocated by the third communication node when the first communication node is in the registered state.

The performing communications may comprise identifying quality of service (QoS) of data to be transmitted from the first communication node; determining the second communication node to which the data is to be transmitted among the plurality of communication nodes based on the identified QoS and a forwarding table preconfigured by the third communication node; establishing a radio bearer for the determined second communication node; and transmitting the data through the established radio bearer.

The first communication node may be connected to the third communication node through H3 interfaces, and connected to at least one communication node among the plurality of communication nodes through H2 interfaces. Also, the first communication node may perform communications with the third communication node based on an MXN H3 control (MH3C) protocol. Also, the first communication node may perform communications with the at least one communication node based on an MXN H2 control (MH2C) protocol.

In order to achieve the objective of the present disclosure, a first communication node for controlling a plurality of communication nodes included in a mobile xhaul network (MXN) supporting mobility may comprise a processor and a memory storing at least one instruction. Also, the at least one instruction may be configured to perform an attach procedure between the first communication node and a second communication node among the plurality of communication nodes; configure a path for communications between the second communication node and a third communication node for which attach procedure has been completed among the plurality of communication nodes; and support communications between the second communication node and the third communication node using the configured path.

The first communication node may perform a function of managing mobility of the plurality of communication nodes, a function of managing paths for communications of the plurality of communication nodes, and a function of managing resources for the plurality of communication nodes.

The first communication node may change a state of the second communication node from a deregistered state into a registered state when the attach procedure between the first communication node and the second communication node is completed.

The first communication node may be connected to the plurality of communication nodes through H3 interfaces, and the plurality of communication nodes may be connected to each other through H2 interfaces.

Using the embodiments according to the present disclosure, the efficiency of communications can be improved by integrating the fronthaul, the midhaul, and the backhaul into a single communication network, and management of a plurality of devices included in the communication network can also be performed efficiently.

Also, operation methods of a communication node for supporting mobility in the communication network according to the present disclosure can significantly reduce CAPEX and OPEX as compared to the conventional case where the fronthaul, the midhaul, and the backhaul are respectively constructed as a dedicated transport network.

Also, the communication network according to the present disclosure can easily support communications with a communication node having mobility, thereby providing flexibility and expandability to the communication network.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
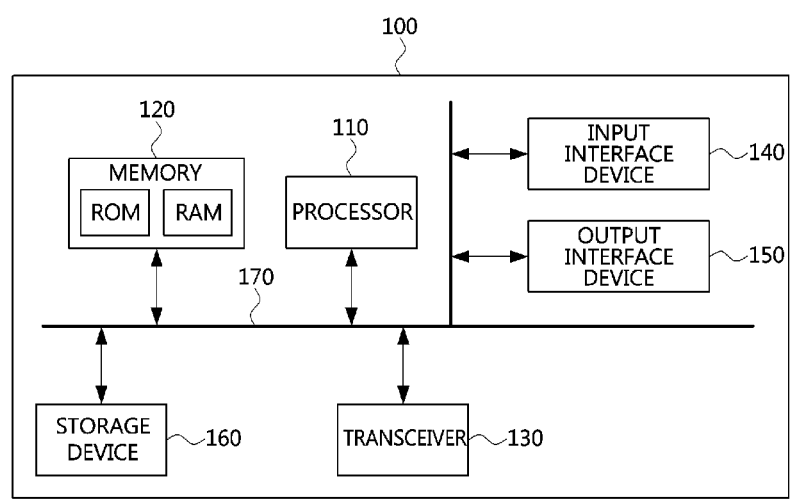
FIG. 1 is a block diagram illustrating a communication node performing an operation method for supporting mobility in a communication network according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a block diagram illustrating a communication node performing an operation method for supporting mobility in a communication network according to an embodiment of the present disclosure.

Referring to FIG. 1, a communication node 100 may comprise at least one processor 110, a memory 120, and a transceiver 130 connected to a communication network for performing communications. Also, the communication node 100 may further comprise an input interface device 140, an output interface device 150, a storage device 160, and the like. Each component included in the communication node 100 may communicate with each other as connected through a bus 170.

The processor 110 may execute at least one instruction stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
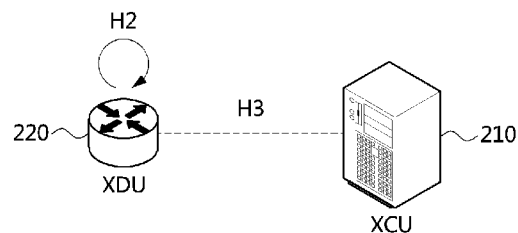
FIG. 2 is a conceptual diagram illustrating a communication network according to an embodiment of the present disclosure most simply.

FIG. 2 is a conceptual diagram illustrating a communication network according to an embodiment of the present disclosure most simply.

A communication network according to an embodiment of the present disclosure may be a network in which a fronthaul, a midhaul, and a backhaul are integrated, and may be referred to as an 'xhaul network' or a 'wireless xhaul network'. Also, the communication network according to the present disclosure may be referred to as a 'mobile xhaul network (MXN)' with emphasis on its support of mobility.

Referring to FIG. 2, the communication network according to an embodiment of the present disclosure may include an xhaul centralized unit (XCU) 210 and an xhaul distributed unit (XDU). The XCU 210 and the XDU 220 included in the communication network according to an embodiment of the present disclosure may have a structure similar to or the same as the structure of the communication node described with reference to FIG. 1. In detail, in the MXN, the XCU 210 may manage a topology of the MXN and paths through which data is transmitted in the MXN. Also, the XCU 210 may perform a function for controlling a plurality of XDUs existing in the MXN.

Also, the XDU 220 may perform a function for wireless communications in the MXN. For example, the XDU 220 may perform a function of transmitting or receiving data of the fronthaul, the midhaul, and the backhaul based on the wireless communications in the MXN. Also, the XDU 220 may be classified into a fixed XDU and a mobile XDU. For example, the fixed XDU may refer to an XDU that is installed at a predetermined location and has no mobility. Also, the mobile XDU may refer to an XDU having mobility, which is installed in a mobile means such as a train and a bus.

The XCU 210 and the XDU 220 included in the communication network according to an embodiment of the present disclosure may be connected through an H3 interface, and the XDU 220 may be connected with a plurality of XDUs included in the communication network through H2 Interfaces. For example, in the MXN, a plurality of XDUs may be connected based on atomic topologies of the MXN. A specific method by which a plurality of XDUs in the MXN are connected based on the topology structure of the MXN will be described with reference to FIGS. 3 to 5 below.

Figure 3A:
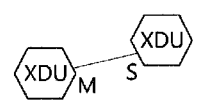
FIGS. 3A to 3C are conceptual diagrams illustrating atomic topologies of a communication network according to an embodiment of the present disclosure.
Figure 3B:
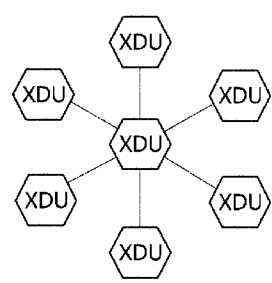
Figure 3C:
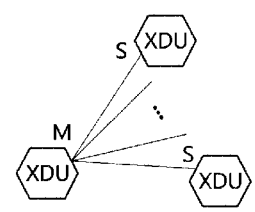

FIGS. 3A to 3C are conceptual diagrams illustrating atomic topologies of a communication network according to an embodiment of the present disclosure.

Referring to FIGS. 3A to 3C, connection schemes according to an embodiment of the present disclosure are examples of atomic topologies consisted of XDU which having six sectors. A plurality of XDUs in the MXN may be connected to each other to various topologies based on an atomic topology, which is the most basic connection scheme consisting the network topology, described in FIG. 3A to 3C. For example, a plurality of XDUs may be connected to each other based on a point-to-point (P2P) connection scheme (FIG. 3A), a multiple point-to-point (MP2P) connection scheme (FIG. 3B), and a point-to-multipoint (P2MP) connection scheme (FIG. 3C).

Specifically, according to the P2P connection scheme, a master sector (denoted by 'M' in FIG. 3A) may be connected to a slave sector (denoted by 'S' in FIG. 3A) in the MXN. Also, according to the MP2P connection scheme, one XDU in the MXN may be connected to each of a plurality of XDUs based on independent P2P connection schemes. Also, according to the P2MP connection scheme, as a master sector in the MXN is connected to a plurality of salve sectors which is different each other, one XDU may be connected to a plurality of XDUs in the MXN.

Figure 4A:
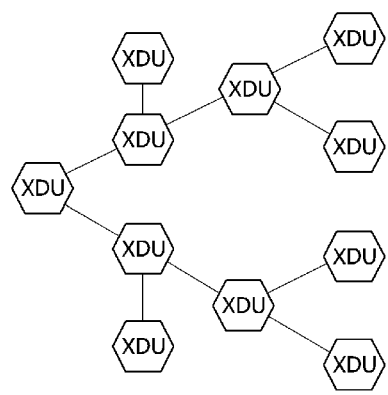
FIGS. 4A to 4C are conceptual diagrams illustrating a first embodiment of a topology of a communication network according to an embodiment of the present disclosure.
Figure 4B:
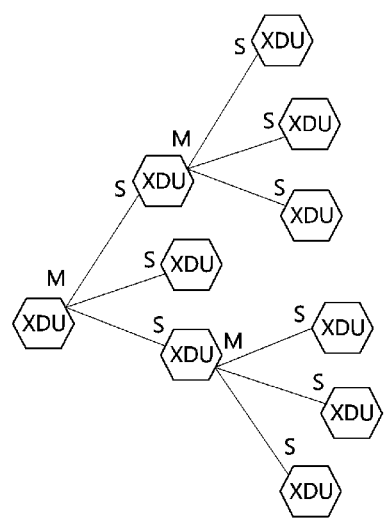
Figure 4C:
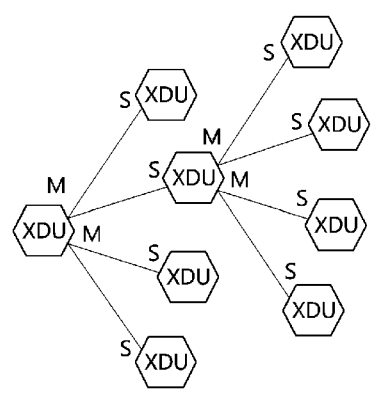
Figure 5:
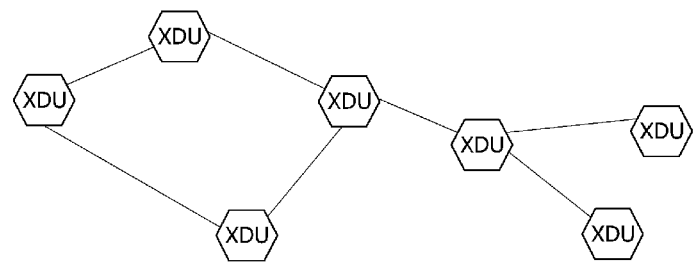
FIG. 5 is a conceptual diagram illustrating a second embodiment of a topology of a communication network according to an embodiment of the present disclosure.

FIGS. 4A to 4C are conceptual diagrams illustrating a first embodiment of a topology of a communication network according to an embodiment of the present disclosure, and FIG. 5 is a conceptual diagram illustrating a second embodiment of a topology of a communication network according to an embodiment of the present disclosure.

Referring to FIGS. 4A to 4C and FIG. 5, examples of topologies for a plurality of XDUs in the MXN, which is a communication network according to an embodiment of the present invention, may be shown. First, as shown in FIGS. 4A to 4C, a plurality of XDUs in the MXN may be connected to each other based on a star topology. Also, as shown in FIG. 5, a plurality of XDUs in the MXN may be connected to each other based on a partial mesh topology.

In FIGS. 4A to 4C and FIG. 5, a master sector may be denoted by and a slave sector may be denoted by 'S'. Based on the topology structures as described above, a plurality of XDUs in the MXN may be connected to each other.

The operation of all the XDUs according to an embodiment of the present disclosure may be performed on a sector-by-sector basis. However, in the specification of the present disclosure, which will be described later, in the case where it is necessary to specifically distinguish the function and operation of a sector unit, it may be described in units of sectors, and in all other cases, it may be described in units of XDUs.

Figure 6:
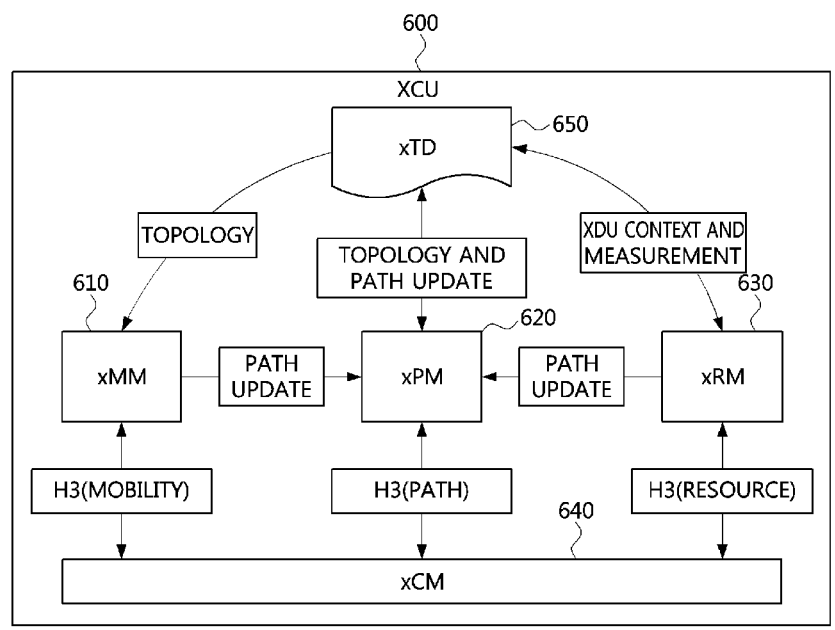
FIG. 6 is a conceptual diagram illustrating an XCU of a communication network according to an embodiment of the present disclosure.

FIG. 6 is a conceptual diagram illustrating an XCU of a communication network according to an embodiment of the present disclosure.

Referring to FIG. 6, a XCU 600 of the MXN may have a structure similar to or the same as the structure of the communication node described with reference to FIG. 1. However, in FIG. 6, logical functional elements that are distinguished based on operations performed in the XCU 600 of the MXN are illustrated. That is, the XCU 600 of the MXN may comprise a plurality of functional elements. Specifically, the XCU 600 may comprise a plurality of functional elements, such as an xhaul mobility management (xMM) 610, an xhaul path management (xPM) 620, an xhaul resource management (xRM) 630, an xhaul control management (xCM) 640, and an xhaul topology database (xTD) 650.

The xMM 610 included in the XCU 600 of the MXN may perform a function of managing mobility of the MXN. For example, the xMM 610 may perform a function of supporting handover of a mobile XDU. Specifically, the xMM 610 may generate a measurement XDU sector list including measurement targets to determine a target XDU of the handover. Here, the measurement XDU sector list generated by the xMM 610 may include a plurality of parameters related to at least one measurement target XDU, a measurement report period, and event conditions for measurement reports.

Also, the xMM 610 may determine a candidate XDU sector based on the generated measurement XDU sector list, and determine a target XDU sector for handover based on the candidate XDU sector. Also, the xMM 610 may determine, for the handover, whether to forward data and whether to perform redundancy transmission. Also, the xMM 610 may determine whether to perform the handover operation. Here, the xMM 610 may request the xPM 620 to perform an operation related to a path management according to the handover (e.g., a path update, etc.).

The xPM 620 included in the XCU 600 of the MXN may perform a function of managing paths of the MXN. For example, the xPM 620 may perform functions of selecting, configuring, changing, and deleting a path in the MXN. Specifically, the xPM 620 may manage a forwarding table constructed for data forwarding in the XDU. Also, the xPM 620 may manage a topology table including information on the topology managed by the XCU 600. Also, the xPM 620 may perform a function of managing backup paths in the MXN. For example, the xPM 620 may manage paths for redundant transmission in the MXN, and may configure parameters related to switching of the paths. Here, when the information on the topology is changed or the information on the paths change, the xPM 620 may transmit information on the changed topology or the changed paths to the xTD 650.

The xRM 630 included in the XCU 600 of the MXN may perform a function of managing resources in order to guarantee a quality-of-service (QoS) class between a source XDU and a destination XDU in the process of performing data transmissions of the XDU. Also, when the amount of resources used in the XDU increases, the xRM 630 may perform a function of controlling the load of the MXN. Also, the xRM 630 may perform a function of measuring the XDU for centralized resource management, and a function of managing reports of measured results. Also, the xRM 630 may perform an authentication function in conjunction with an attach procedure for the XDU. In this case, when the information on the paths changes, the xRM 630 may transmit information on the changed paths to the xPM 620. Also, the xRM 630 may transmit the measured result to the xTD 650 for resource management and may receive context information of the XDU from the xTD 650.

The xCM 640 included in the XCU 600 of the MXN may perform a function of interfacing with a communication node (e.g., an XDU, etc.) connected to the XCU 600. For example, the xCM 640 may forward a message (e.g., an H3 interface message) received from a communication node connected to the XCU 600 to a functional element associated with the message. That is, the xCM 640 may forward the received message to the xMM 610 when the received message is related to the mobility management. The xCM 640 may also forward the received message to xPM 620 when the received message is related to the path management. The xCM 640 may also forward the received message to the xRM 630 when the received message is related to the resource management.

The xTD 650 included in the XCU 600 of the MXN may store information according to each function performed in the XCU 600. For example, the xTD 650 may store information on the topology of the MXN based on the information on the context and links of the XDU. Also, the xTD 650 may store information on end-to-end paths of the MXN, which are generated in the process of managing the paths.

Figure 7:
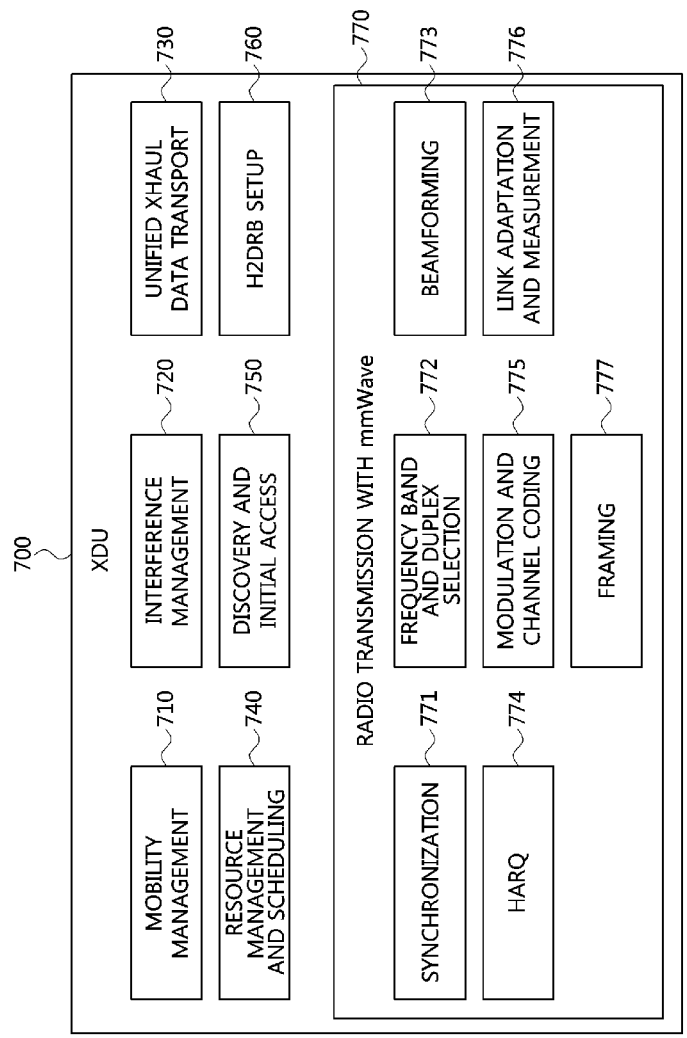
FIG. 7 is a conceptual diagram illustrating an XDU of a communication network according to an embodiment of the present disclosure.

FIG. 7 is a conceptual diagram illustrating an XDU of a communication network according to an embodiment of the present disclosure.

Referring to FIG. 7, an XDU 700 of the MXN may have a structure similar to or the same as that of the communication node described with reference to FIG. 1. However, in FIG. 7, logical functional elements that are distinguished based on operations performed in the XDU 700 of the MXN are illustrated. That is, the XDU 700 of the MXN may include a plurality of functional elements. Specifically, the XCU 700 may comprise a plurality of functional elements, such as a mobility management 710, an interference management 720, a unified xhaul data transport 730, a resource management and scheduling 740, a node discovery and initial access 750, a H2DRB setup 760, and a radio transmission with mmWave 770.

The mobility management 710 included in the XDU 700 of the MXN may perform measurement operations for handover of the XDU 700, and report results of the measurement operations. Also, the mobility management 710 may perform triggering for the handover of the XDU 700, and may perform a handover procedure according to the triggering.

Also, the interference management 720 included in the XDU 700 of the MXN may configure parameters related to interference measurements when the XDU 700 is an XDU corresponding to a master sector, and transmit and receive messages related to interference control with coordinator performing function of interference management. Also, the interference management 720 may also perform interference measurements when the XDU 700 is an XDU corresponding to a slave sector. Also, the interface management 720 may determine information related to coordination between XDUs.

Also, the unified xhaul data transport 730 included in the XDU 700 of the MXN may perform conversion for a unified data transport protocol of the MXN. Also, the unified xhaul data transport 730 may perform multi-hop transmission based on QoS of data. Also, the unified xhaul data transport 730 may perform duplicate transmission and reception of data, and divided transmission and reception of data.

Also, the resource management and scheduling 740 included in the XDU 700 of the MXN may perform functions related to measurement and reporting for the XDU to allocate resources for the links of the MXN. Also, the resource management and scheduling 740 may allocate resources for the links in the MXN. Also, the resource management and scheduling 740 may perform functions related to measurement and reporting to the XCU for centralized resource management.

Also, the discovery and initial access 750 included in the XDU 700 of the MXN may transmit and receive a discovery signal in a discovery procedure of the XDU 700. Also, the discovery and initial access 750 may identify an XDU adjacent to the XDU 700 in the MXN, and establish a link with the identified XDU. Here, the discovery and initial access 750 may manage information on the discovered or identified XDU.

Also, the H2DRB setup 760 included in the XDU 700 of the MXN may establish (or generate) a radio bearer between the XDUs, and change or release the established radio bearer. Also, the radio transmission with mmWave 770 included in the XDU 700 of the MXN may perform wireless transmission to a XDU using a plurality of beams or a plurality of layers formed by multiple antennas, based on millimeter-wave. In order to perform such the function, the radio transmission with mmWave 700 may include a plurality of functional elements, such as a synchronization 771, a frequency band and duplex selection 772, a beamforming 773, a HARQ 774, a modulation and channel coding 775, a link adaptation and measurement 776, and a framing 777.

Hereinafter, a state of the XDU 700 depending on the status of attachment and whether a link is established in the MXN will be specifically described.

Figure 8:
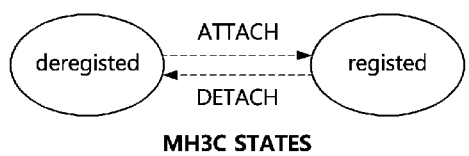
FIG. 8 is a conceptual diagram illustrating a first embodiment of states of an XDU in a communication network according to an embodiment of the present disclosure.
Figure 9:
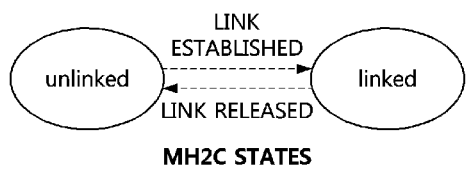
FIG. 9 is a conceptual diagram illustrating a second embodiment of states of an XDU in a communication network according to an embodiment of the present disclosure.

FIG. 8 is a conceptual diagram illustrating a first embodiment of states of an XDU in a communication network according to an embodiment of the present disclosure, and FIG. 9 is a conceptual diagram illustrating a second embodiment of states of an XDU in a communication network according to an embodiment of the present disclosure.

Referring to FIGS. 8 and 9, a state of the XDU may depend on MXN H2 control (MH2C) states and MXN H3 control (MH3C) states according to the status of attachment of the XDU and whether a link is established. Specifically, FIG. 8 illustrates states of the XDU associated with the MH3C states, and FIG. 9 illustrates states of the XDU associated with the MH2C states.

Referring to FIG. 8, in the MXN, the XDU may be in a 'registered' state meaning that the attach procedure to the XCU is completed and the XDU is registered. As described above, when the XDU is in the 'registered' state, an XDU identifier (ID) may be allocated from the XCU. On the other hand, in the MXN, the XDU may be in a 'deregistered' meaning that the detach procedure to the XCU is completed and the XDU is not registered. That is, if the XDU is in the 'deregistered' state, it may mean that the XDU is in a state of being not attached to the MXN.

Also, as shown in FIG. 9, an XDU in the MXN may be in a 'linked' state meaning that a link (e.g., a wireless link) is established with another XDU. On the other hand, in the MXN, an XDU may be in an 'unlinked' state meaning that a link is not established with another XDU or that a link with another XDU is released after being established. Such the states of the XDU in the MXN may be represented as shown in Table 1 below.

TABLE 1

| Layer | State | Description |
|---|---|---|
| H2MC | Linked | State in which a link is established with another XDU |
| | Unlinked | State in which a link is not established with another XDU |
| H3MC | Registered | State in which the attach procedure to XCU is completed, and a XDU ID is allocated |
| | Deregistered | State in which the detach procedure to XCU is completed, and the XDU is not attached. |

Meanwhile, each sector of the XDU in the MXN may operate one mode among master, slave, or idle mode. Specifically, description of respective operation modes of each sector for the XDU are shown in Table 2 below.

TABLE 2

| Operation mode | Description |
|---|---|
| Master | Allocates resources to linked XDU sectors (an XDU aggregator and a root XDU in a tree topology always operate either in a master mode or in an idle mode) Allocates resources for transmission and reception links of slave XDU sector Allocates resources based on information received from slave XDU sectors (e.g., channel information and load information) and measurement information Measures information on slave XDU sectors and reports the measured results to XCU |
| Slave | Uses resources allocated by the linked master XDU sector Periodically or non-periodically reports information such as channel information and load information to a master XDU |
| Idle | Unused XDU which is neither a master XDU nor a slave XDU |

In the MXN, each sector of XDU may operate in one of the operation modes described in Table 2. Specifically, an XDU aggregator (XDU-A) may refer to an XDU directed connected with the XCU. And, each sector of the XDU aggregator may operate in the master mode or the idle mode among the operation modes of the XDU. On the other hand, the XDU aggregator cannot operate in the slave mode. Also, in case that the XDU is a moving XDU having mobility, each sector of the XDU having mobility may operate either in the slave mode or in the idle mode. On the other hand, each sector of the XDU having mobility cannot operate in the master mode.

Hereinafter, with reference to FIGS. 10 to 13, a plurality of embodiments of protocol structures of the MXN will be specifically described.

Figure 10:
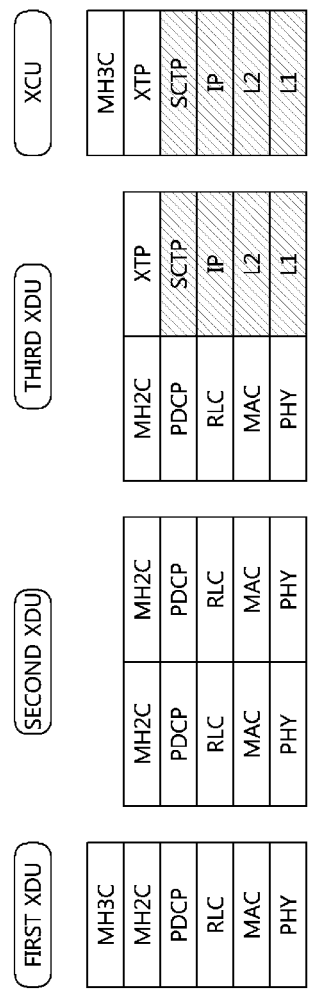
FIG. 10 is a conceptual diagram illustrating a first embodiment of a control plane protocol structure of a communication network according to an embodiment of the present disclosure.
Figure 11:
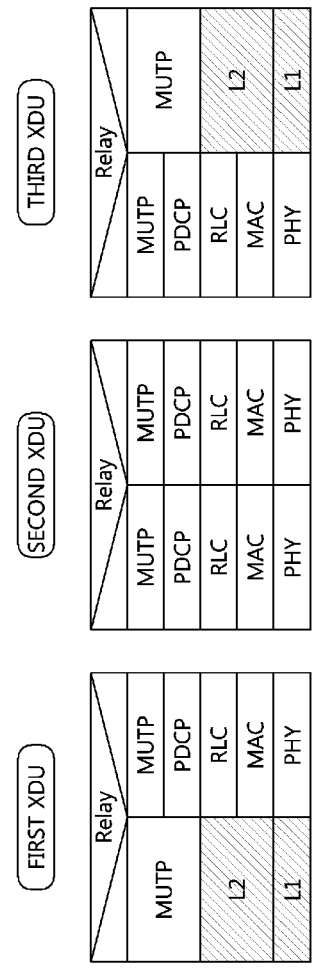
FIG. 11 is a conceptual diagram illustrating a second embodiment of a user plane protocol structure of a communication network according to an embodiment of the present disclosure.
Figure 12:
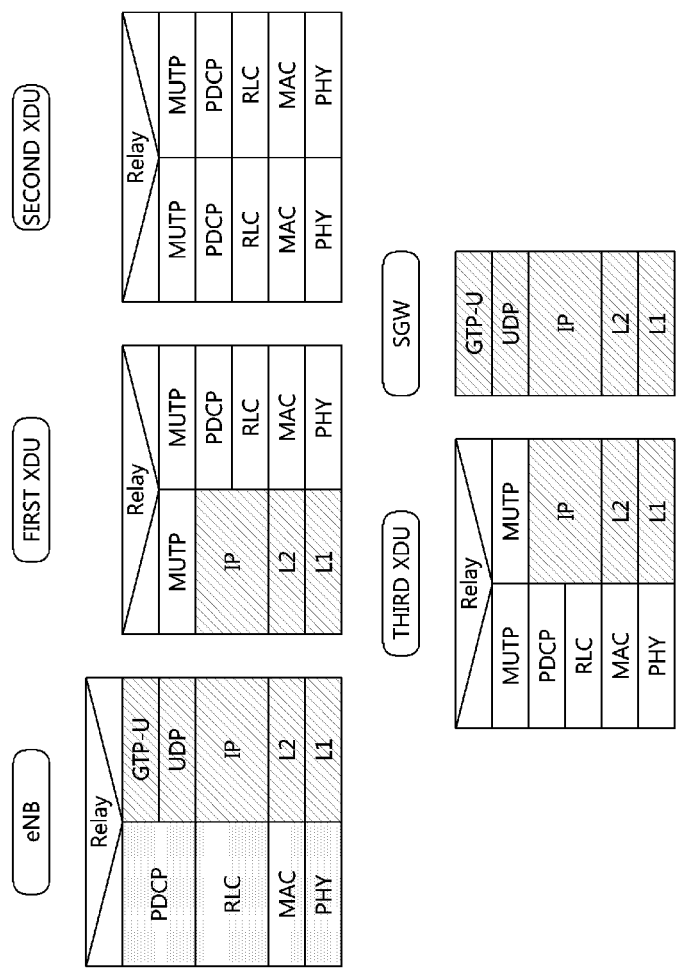
FIG. 12 is a conceptual diagram illustrating a third embodiment of a protocol structure of a communication network according to an embodiment of the present disclosure.
Figure 13:
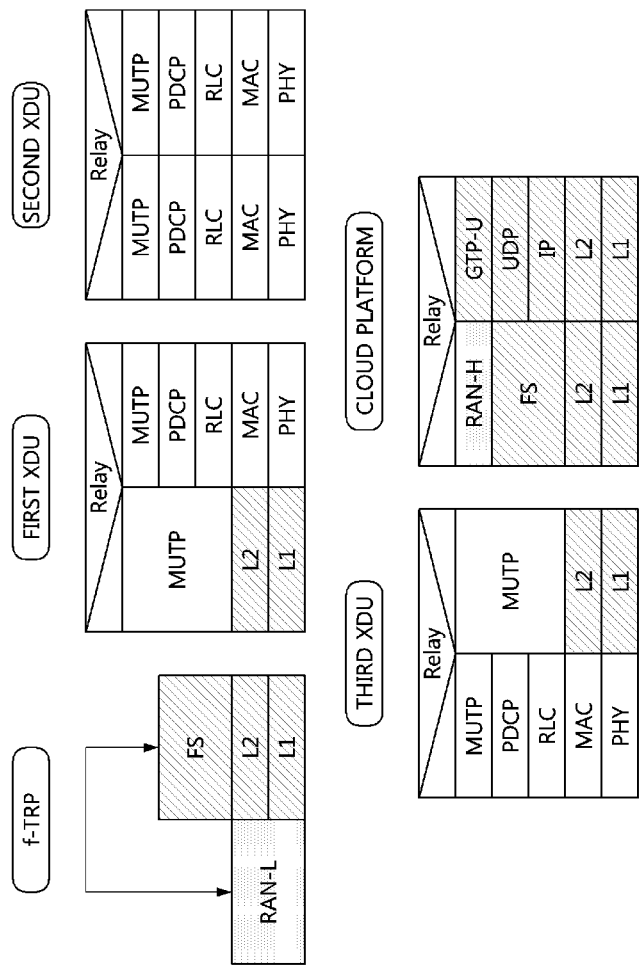
FIG. 13 is a conceptual diagram illustrating a fourth embodiment of a protocol structure of a communication network according to an embodiment of the present disclosure.

FIG. 10 is a conceptual diagram illustrating a first embodiment of a control plane protocol structure of a communication network according to an embodiment of the present disclosure, and FIG. 11 is a conceptual diagram illustrating a second embodiment of a user plane protocol structure of a communication network according to an embodiment of the present disclosure. Also, FIG. 12 is a conceptual diagram illustrating a third embodiment of a protocol structure of a communication network according to an embodiment of the present disclosure, and FIG. 13 is a conceptual diagram illustrating a fourth embodiment of a protocol structure of a communication network according to an embodiment of the present disclosure.

Referring to FIGS. 10 to 13, protocol structures of the MXN may comprise basically a packet data convergence protocol (PDCP) layer, a radio link control (RLC) control layer, a medium access control (MAC) layer, and a physical (PHY) layer.

Referring to FIG. 10, a protocol structure according to a control plane of the MXN may be identified. Specifically, the protocol structure according to the control plane in the MXN may further include an MH2C layer for control between XDUs and an MH3C layer for control between an XDU and the XCU. Also, the protocol structure according to the control plane of the MXN may further include an xhaul tunneling protocol (XTP) layer for supporting communications between the XDU aggregator and the XCU through an IP (internet protocol) network.

For example, in the MXN, a first XDU may have a protocol structure including an MH3C layer, an MH2C layer, a PDCP layer, an RLC layer, a MAC layer, and a PHY layer. Also, a second XDU may have a protocol structure including an MH2C layer, a PDCP layer, an RLC layer, a MAC layer, and a PHY layer for performing communication with the first XDU and a third XDU. Also, the third XDU may have a protocol structure including an MH2C layer, a PDCP layer, an RLC layer, a MAC layer, and a PHY layer for performing communications with the second XDU. Also, the third XDU may have a protocol structure including an XTP layer, a stream control transmission protocol (SCTP) layer, an IP layer, an L2 layer and an L1 layer for performing communications with the XCU. Also, the XCU may have a protocol structure including an MH3C layer, an XTP layer, an SCTP layer, an IP layer, an L2 layer and an L1 layer. As described above, the protocol structure according to the control plane in the MXM may be a structure for transmission of control data with a relatively high reliability requirement.

Referring to FIG. 11, a protocol structure according to a user plane of the MXN may be identified. Specifically, the protocol structure according to the user plane in the MXN may further include an MXN unified transport protocol (MUTP) layer for performing data forwarding to an upper layer. The MUTP layer may perform packet encapsulation and decapsulation functions for interoperation of MXN with external networks. Also, the MUTP layer may be a protocol for multi-hop based data forwarding functions in the MXN.

For example, in the MXN, a first XDU may have a protocol structure including an MUTP layer, an L2 layer, and an L1 layer. Also, the first XDU may have a protocol structure including a MUTP layer, a PDCP layer, an RLC layer, a MAC layer, and a PHY layer for performing communications with a second XDU. Also, the second XDU may have a protocol structure including a MUTP layer, a PDCP layer, an RLC layer, a MAC layer, and a PHY layer for performing communications with the first XDU and a third XDU. Also, the third XDU may have a protocol structure including a MUTP layer, a PDCP layer, an RLC layer, a MAC layer, and a PHY layer for performing communications with the second XDU. In addition, the third XDU may have a protocol structure including an MUTP layer, an L2 layer, and an L1 layer. As described above, the protocol structure according to the user plane in the MXN may be a structure for supporting various external interfaces.

Referring to FIGS. 12 and 13, there are various types of external networks that are connected based on the user plane of the MXN. Specifically, in FIG. 12, an external network interworking based on the user plane of the MXN may be an IP network when the MXN is used as a backhaul enabling communications between eNB and a serving gateway (SGW) of an evolved packet core (EPC) through the XDUs. For example, the eNB may have a protocol structure including a PDCP layer, an RLC layer, a MAC layer, and a PHY layer. Also, the eNB may have a protocol structure including a GPRS tunneling protocol-user plane (GTP-U) layer, a user datagram protocol (UDP) layer, an IP layer, an L2 layer, and an L1 layer. Also, a first XDU may have a protocol structure including an MUTP layer, an IP layer, an L2 layer, and an L1 layer. Also, the first XDU may have a protocol structure including a MUTP layer PDCP layer, an RLC layer, a MAC layer, and a PHY layer. Also, the second XDU may have a protocol structure including a MUTP layer PDCP layer, an RLC layer, a MAC layer, and a PHY layer for performing communications with the first XDU and a third XDU. Also, the third XDU may have a protocol structure including a MUTP layer PDCP layer, an RLC layer, a MAC layer, and a PHY layer. Also, the third XDU may have a protocol structure including an MUTP layer, an IP layer, an L2 layer, and an L1 layer. Also, the SGW may have a protocol structure including a GTP-U layer, a UDP layer, an IP layer, an L2 layer, and an L1 layer.

Also, in FIG. 13, an external network interworking based on the user plane of the MXN may be an Ethernet/IP network when the MXN is used as a midhaul enabling communications between a flexible transmission and reception point (f-TRP) and a cloud platform through the XDUs.

For example, the f-TRP may have a protocol structure including a RAN-L layer (in a case that the entire function of the base station is split into two layer, the layer including lower protocol layer which including physical layer is referred to as RAN-L layer), an FS layer (a layer supporting the function split of the base station), an L2 layer, and an L1 layer. Also, a first XDU may have a protocol structure including a MUTP layer, a PDCP layer, an RLC layer MAC layer, and a PHY layer for performing communications with a second XDU. Also, the second XDU may have a protocol structure including a MUTP layer, a PDCP layer, an RLC layer MAC layer, and a PHY layer for performing communications with the first XDU and a third XDU. Also, the third XDU may have a protocol structure including a MUTP layer, a PDCP layer, an RLC layer MAC layer, and a PHY layer for performing communications with the second XDU. Also, the third XDU may have a protocol structure including an MUTP layer, an L2 layer, and an L1 layer. Also, the cloud platform may have a protocol structure including a RAN-H layer (in a case that the entire function of the base station is split into two layer, layer including upper protocol layer which including PDCP layer is referred to as RAN-H layer), an FS layer, an L2 layer, and an L1 layer. Also, the cloud platform may have a protocol structure including a GTP-U layer, a UDP layer, an IP layer, an L2 layer, and an L1 layer.

Figure 14:
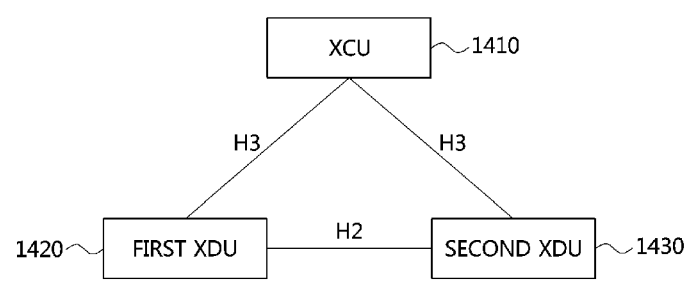
FIG. 14 is a conceptual diagram illustrating a reference model of a communication network according to an embodiment of the present disclosure.

FIG. 14 is a conceptual diagram illustrating a reference model of a communication network according to an embodiment of the present disclosure.

Referring to FIG. 14, a reference model of the MXN may be shown. Specifically, the reference model of the MXN may include an XCU 1410, a first XDU 1420, and a second XDU 1430. In the MXN, the XCU 1410 may be connected to each of the first XDU 1420 and the second XDU 1430 via an H3 interface. Also, the first XDU 1410 may be connected to the XCU 1410 via the H3 interface, and may be connected to the second XDU 1430 via the H2 interface. Also, the second XDU 1430 may be connected to the XCU 1410 via the H3 interface and the first XDU 1420 through the H2 interface.

That is, in the MXN, the XCU 1410 may transmit and receive H3 interface messages with the first XDU 1420 and the second XDU 1430 based on the H3 interface. Also, in the MXN, the first XDU 1420 and the second XDU 1430 may transmit and receive H2 interface messages based on the H2 interface. Also, the first XDU 1420 and the second XDU 1430 may transmit and receive H3 interface messages to and from the XCU 1410 based on the H3 interface. Specifically, in the MXN, the H2 interface message transmitted and received based on the H2 interface may be expressed as shown in Table 3 below.

TABLE 3

| Procedure | Messages | Description |
|---|---|---|
| Link setup | Link setup request | Request to establish a link between XUDs |
| | Link setup response | Response to a link setup request |
| | Link setup complete | Confirmation of completion of establishment of a link |
| H2DRB setup | H2DRB setup request | Request to establish a radio bearer for data transmission between XDUs |
| | H2DRB setup response | Response to an H2DRB setup request |
| Transfer | H3 transfer | Transfer of an H3 message |
| Handover | Handover command | H2 control message for start of handover (active XDU → mobile XDU) |
| | Handover complete | H2 control message of handover completion |

Table 3 shows H2 interface messages transmitted and received via the H2 interface in the MXN. Referring to Table 3, the H2 interface messages may be messages defined in accordance with procedures related to functions performed in the XDU and XCU. Hereinafter, H3 interface messages transmitted and received based on the H3 interface in the MXN may be represented as shown in Table 4 below.

TABLE 4

| Procedure | Messages | Description |
|---|---|---|
| Attach | Attach request | Request to register information of an XDU to the XCU |
| | Attach response | Response to an attach request |
| | Attach complete | Confirmation of completion of the attach procedure |
| Path management | Path setup request | Request to configure a path for an XDU (add/change/remove) |
| | Path setup response | Activate forwarding rule of XDUs including in a primary path configured according to path setup request |
| | Path activation indication | Activate a primary path of the anchor XDU having a configured backup path (transmitted from the XCU(xPM) and an XDU(the joint XDU)) |
| | Path deactivation indication | Deactivate a primary path of the anchor XDU having a configured backup path (transmitted from the XCU(xPM) and an XDU(the joint XDU)) |
| Measurement | Measurement configuration | Configure measurements and reports for an XDU |
| | Measurement report | Report information measured for an XDU to the XCU |
| Load control | Load control request | Request load control for XDU (XDU → XCU) |
| | Load control response | Response to a load control request (XCU → XDU) |

TABLE 4-continued

| Procedure | Messages | Description |
|---|---|---|
| Mobility/ handover | Handover request Handover response Handover complete Measurement sector list | Request of handover (active XDU → XCU) Response to a handover request (XCU → active XDU) Completion of handover (target XDU → XCU) Information on measurement XDU sectors for handover (XCU → mobile XDU) |

Table 4 shows H3 interface messages transmitted and received through the H3 interface in the MXN. Referring to Table 4, the H3 interface messages may be messages defined in accordance with procedures related to functions performed in the XDU and XCU.

Figure 15:
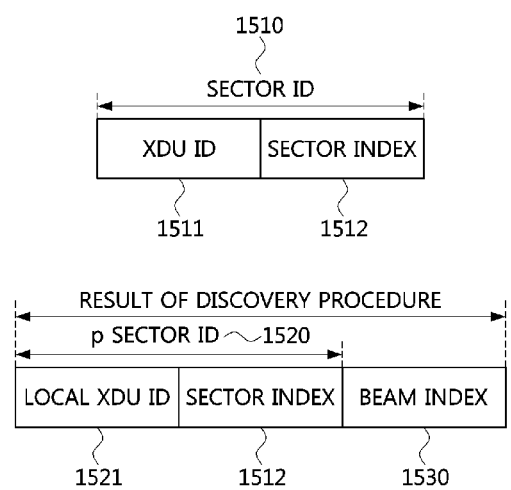
FIG. 15 is a conceptual diagram for explaining an identifier used in a communication network according to an embodiment of the present disclosure.

FIG. 15 is a conceptual diagram for explaining an identifier used in a communication network according to an embodiment of the present disclosure.

Referring to FIG. 15, an identifier used in the MXN may include a sector ID 1510, a p sector ID 1520, and a beam index 1530. Here, the p-sector ID 1520 and the beam index 1530 in the MXN may be obtained through a discovery procedure.

Specifically, the sector ID 1510 may include an XDU ID 1511 and a sector index 1512, and may mean an identifier for identifying a sector in the MXN. The XDU ID 1511 included in the sector ID 1510 may be an identifier for identifying the XDU in the MXN. Also, the XDU ID 1511 may be obtained by being allocated by the XCU when the attach procedure with the XCU is completed. Also, in case that the XDU ID 1511 is defined in the sector ID 1510 together with the sector index 1512, the XDU ID 1511 may be used as a parameter for managing the path of the MXN. Also, the sector index 1512 included in the sector ID 1510 may refer to an identifier for identifying a sector in the XDU. Also, in case that the sector index 1512 is defined in the sector ID 1510 together with the XDU ID 1511, the sector index 1512 may be used as a parameter for managing the path of the MXN.

Also, the p sector ID 1520 may include a local XDU ID 1521 and a sector index 1512. Specifically, the local XDU ID 1521 may be a part of information on a sector obtained through the discovery procedure except for the sector index 1512 and the beam index 1530. The local XDU ID 1521 may refer to an identifier for identifying the XDU in the discovery procedure. In case that the local XDU ID 1521 is defined in the p sector ID 1520 together with the sector index, the local XDU ID 1521 may be used as a parameter for a scrambling or cyclic redundancy check (CRC) masking procedure in a PHY layer of the MXN. For example, the p sector ID 1520 of the master XDU may be used in a procedure for scrambling unicast data and scheduling information transmitted from the master XDU to the slave XDU. Also, the p sector ID 1520 of the slave XDU may be used as a parameter for the CRC masking procedure. Also, the local XDU ID 1521 may be included in a synchronization signal transmitted through the sector. Also, the beam index 1530 may refer to an identifier for identifying a beam within a sector of the MXN. The beam index 1530 may also be used to distinguish a beam in one sector in the discovery procedure. Also, the beam index 1530 may not be included in the synchronization signal transmitted within the sector, but may be identified based on information on resources used for beam sweeping during the discovery procedure, FIG. 16 is a conceptual diagram for explaining a method of establishing a bearer in a communication network according to an embodiment of the present disclosure.

Figure 16:
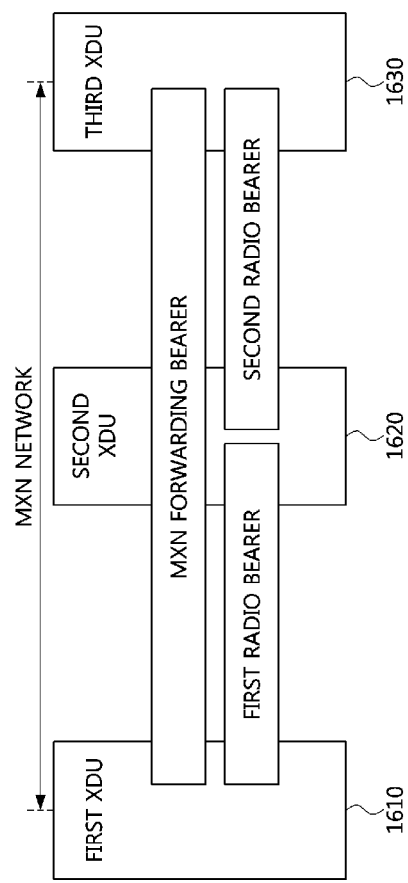
FIG. 16 is a conceptual diagram for explaining a method of establishing a bearer in a communication network according to an embodiment of the present disclosure.

Referring to FIG. 16, a bearer service structure of the MXN may be shown. Specifically, the MXN may include a first XDU 1610, a second XDU 1620, and a third XDU 1630. The first XDU 1610, the second XDU 1620, and the third XDU 1630 included in the MXN may establish a bearer in consideration of QoS characteristics of data. Specifically, the first XDU 1610, the second XDU 1620, and the third XDU 1630 of the MXN may configure an MXN forwarding bearer based on a first radio bearer and a second radio bearer which are MXN radio bearers transmitting packet based on one-hop transmitting. The first XDU 1610, the second XDU 1620, and the third XDU 1630 of the MXN may support multi-hop transmission according to QoS characteristics based on the MXN forwarding bearer between the first XDU 1610 and the third XDU 1630.

For example, in the MXN, the first XDU 1610 may perform multi-hop transmission to the third XDU 1630 using the MXN forwarding bearer based on forwarding rules configured by the XCU. Also, in the MXN, the first XDU 1610 may map data to a QoS class in consideration of QoS characteristics of the data, and transmit the data to the second XDU 1620 through the first radio bearer based on the forwarding rules configured by the XCU. In the same manner, the second XDU 1620 may transmit data to the third XDU 1630 through the second radio bearer in consideration of QoS of the data.

In the following, QoS characteristics of the MXN will be described. The traffic associated with the data transmission of the MXN may include backhaul traffic (e.g., S1-C, S1-U, X2-C, X2-U, OAM), midhaul traffic, and fronthaul traffic. Specifically, the fronthaul traffic may have a delay budget requirement of several hundreds of microseconds, and may be supported with a high bit error ratio (BER) and low jitter. Also, the QoS class of the midhaul traffic may be classified based on a radio bearer identifier (RBID) or a logical channel identifier (LCID) according to functional split. Also, the backhaul traffic may be classified into a control packet and a data packet. In case of a data packet, the QoS class of the backhaul traffic may be classified based on a differentiated services code point (DSCP) field of an IP header.

Also, the MXN may support 5G low-latency service based on QoS characteristics. Also, the MXN may support requirements for priority as QoS characteristics. For example, a control packet for the midhaul traffic and the backhaul traffic in the MXN may have a higher priority than a data packet. Also, in the MXN, the fronthaul traffic may have the minimum latency requirements. Also, the midhaul traffic and the backhaul traffic in the MXN may be classified into low, medium, and high classes according to service latency requirements, and priorities may be determined based on the class of traffic. Also, the priority level according to the QoS characteristic of the MXN may be referred to Table 5 below.

TABLE 5

| | Packet delay budget | Priority level | Exemplary service |
|---|---|---|---|
| Signaling | Reliable transmission | 1 | Fronthaul or midhaul control LTE (Long Term Evolution) signaling (S1), IMS (IP Multimedia Subsystem) signaling |

TABLE 5-continued

| | Packet delay budget | Priority level | Exemplary service |
|---|---|---|---|
| Fronthaul corresponding to CPRI | <10~100 μs BER: $10^{-12}$ Jitter: several nanoseconds | 2 | |
| Low-latency backhaul and midhaul | <1 ms | 3 | Low-latency service, X2 high priority |
| Medium-latency backhaul and midhaul | <1~5 ms | 4 5 | Mission critical Real-time game, X2 low priority |
| High-latency backhaul and midhaul | <5~20 ms | 6 7 8 | Voice and video conversation Buffered streaming, mission critical Voice and video (live streaming), interactive game |
| Non real-time | >20 ms | 9 | Best effort |

Figure 17:
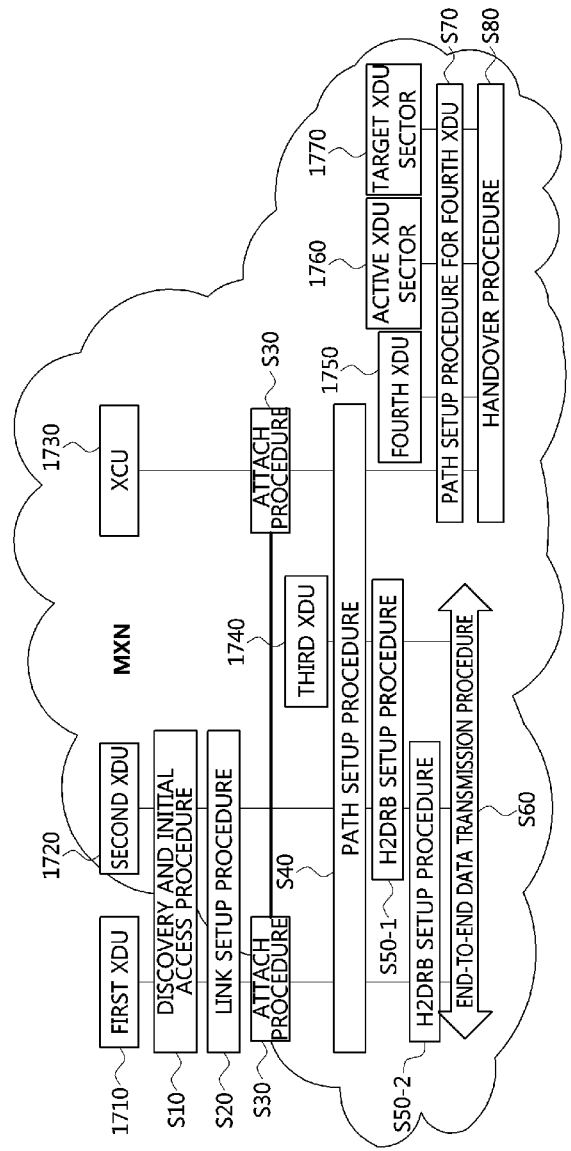
FIG. 17 is a conceptual diagram for explaining an operation method of a communication node for supporting mobility in a communication network according to an embodiment of the present disclosure.

FIG. 17 is a conceptual diagram for explaining an operation method of a communication node for supporting mobility in a communication network according to an embodiment of the present disclosure.

Referring to FIG. 17, an operation method of a communication node for supporting mobility may be based on a plurality of functional elements included in each of the XCU and XDU described with reference to FIGS. 6 and 7. Specifically, the MXN illustrated in FIG. 17 may include a first XDU 1710, a second XDU 1720, an XCU 1730, a third XDU 1740, and a fourth XDU 1750.

In the MXN, the first XDU 1710 and the second XDU 1720 may perform a discovery and initial access procedure (S10). For example, the first XDU 1710 may perform a discovery procedure on a plurality of XDUs included in the MXN, thereby searching for the second XDU 1720. Thereafter, the first XDU 1710 may perform an initial transmission and reception for the discovered second XDU 1720.

Thereafter, the first XDU 1710 and the second XDU 1720 may perform a link setup procedure (S20). For example, the link setup procedure S20 performed in the first XDU 1710 and the second XDU 1720 may mean a procedure for configuring the MH2C protocol for performing communications between the first XDU 1710 and the second XDU 1720.

The first XDU 1710 may then perform an attach procedure with the XCU 1730 (S30). That is, the attach procedure (S30) performed between the first XDU 1710 and the XCU 1730 may refer to a procedure in which the first XDU 1710 is registered in the MXN. Here, information on the first XDU 1710 may be registered in the XCU 1730, and an authentication procedure for the first XDU 1710 may be performed. Also, the XCU 1730 may allocate an XDU ID to the first XDU 1710.

Then, in the MXN, the XCU 1730 may perform a path setup procedure for the first XDU 1710, the second XDU 1720, and the third XDU 1740 included in the MXN (S40). For example, the path setup procedure (S40) performed in the XCU 1730 may mean a procedure for calculating a path for end-to-end data transmission, and configuring forwarding tables in the first XDU 1710, the second XDU 1720, and the third XDU 1740 based on the calculated path. Then, in the MXN, the second XDU 1720 and the third XDU 1740 may perform an H2DRB setup procedure (S50-1). Also, the first XDU 1710 and the second XDU 1720 may perform an H2DRB setup procedure (S50-2). For example, the H2DRB setup procedures S50-1 and S50-2 may refer to procedures for establishing radio bearers for transmitting data through links between XDUs connected through H2 interfaces. The first XDU 1710, the second XDU 1720 and the third XDU 1740 may then perform an end-to-end data transmission procedure S60 based on the radio link bearers along the established paths in the MXN.

Meanwhile, in the MXN, the XCU 1730 may perform a path setup procedure for the fourth XDU 1750 (S70). For example, the fourth XDU 1750 may mean a mobile XDU having mobility installed at a train. Specifically, the XCU 1730 may establish a backup path for handover of the fourth XDU 1750, or establish a path to a target XDU sector 1770. The XCU 1730 and the fourth XDU 1750 may then perform a handover procedure for the fourth XDU 1750 in the MXN (S80). For example, the XCU 1730 may change the active XDU sector 1760 to the target XDU sector 1770 while maintaining service continuity for the fourth XDU 1750.

Figure 18:
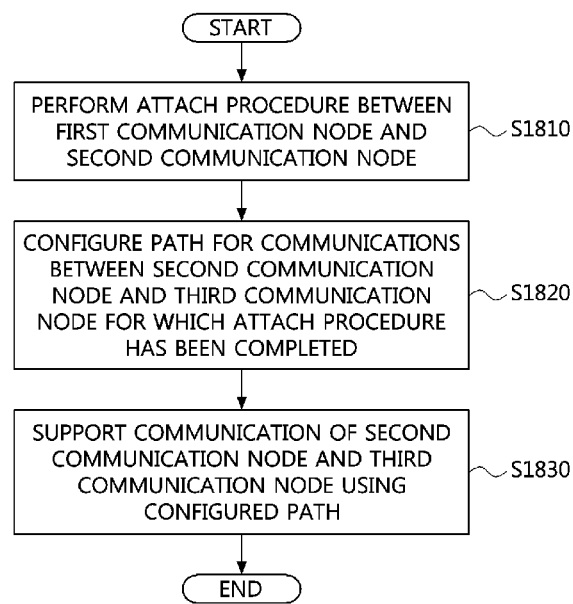
FIG. 18 is a flowchart for explaining an operation method of a communication node for supporting mobility in a communication network according to an embodiment of the present disclosure.

FIG. 18 is a flowchart for explaining an operation method of a communication node for supporting mobility in a communication network according to an embodiment of the present disclosure.

Referring to FIG. 18, an operation method according to an embodiment of the present disclosure may be performed by a first communication node controlling a plurality of communication nodes included in the MXN. Here, the first communication node may have a structure similar to or the same as the structure of the communication node described with reference to FIG. 1. Also, the first communication node may be the XCU described with reference to FIGS. 2 to 17. For example, the first communication node may have a function of managing mobility for the plurality of communication nodes, a function of managing paths for communications of the plurality of communication nodes, a function of managing resources for the plurality of communication nodes, and the like.

First, the first communication node may perform an attach procedure between the first communication node and a second communication node of the plurality of communication nodes (S1810). Specifically, the attach procedure performed between the first communication node and the second communication node may refer to the attach procedure S30 described with reference to FIG. 17. Here, the second communication node may be the XDU described with reference to FIGS. 2 to 17. Here, when the first communication node completes the attach procedure between the first communication node and the second communication node, the first communication node may change the state of the second communication node from an deregistered state to a registered state. Also, the first communication node may allocate an ID of the second communication node to the second communication node when the second communication node is in the registered state.

Then, the first communication node may configure a path for communications between the second communication node and a third communication node that has completed the attach procedure (S1820). Specifically, a path setup procedure at the first communication node may refer to the path setup procedure S40 described with reference to FIG. 17. For example, the first communication node may select a path for communications between the second communication node and the third communication node, and may configure forwarding tables along the selected path.

Thereafter, the first communication node may support communications of the second communication node and the third communication node using the configured path (S 1830). Specifically, the procedure for supporting the communication of the second communication node and the third communication node at the first communication node may refer to the end-to-end data transmission procedure S60 described with reference to FIG. 17. Also, the first communication node may support communications between the second communication node and the third communication node by managing a path for transmitting data at the second communication node or by managing resources for the communications.

Meanwhile, in the MXN, the first communication node and the plurality of communication nodes may be connected through the H3 interfaces, and each of the plurality of communication nodes may be connected to each other through the H2 interfaces. That is, the first communication node may perform communication based on the MH3C protocol with the plurality of communication nodes connected through the H3 interfaces. Also, the second communication node may perform communications based on the MH2C protocol with communication node connected through the H2 interfaces. Specifically, the MXN may have the same structure as the reference model described with reference to FIG. 14.

Figure 19:
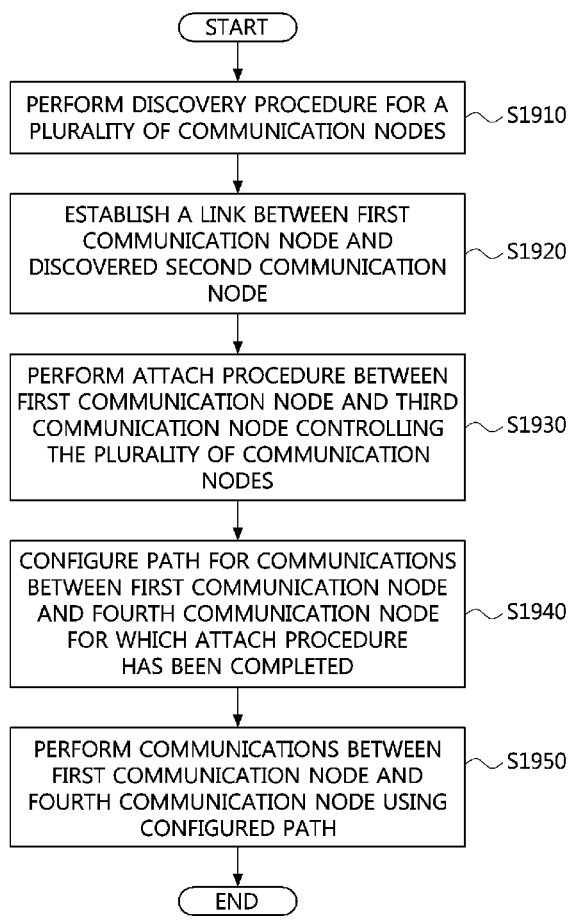
FIG. 19 is a flowchart for explaining an operation method of a communication node for supporting mobility in a communication network according to another embodiment of the present disclosure.

FIG. 19 is a flowchart for explaining an operation method of a communication node for supporting mobility in a communication network according to another embodiment of the present disclosure.

Referring to FIG. 19, an operation method according to an embodiment of the present disclosure may be performed by a first communication node among the plurality of communication nodes included in the MXN.

First, the first communication node may perform a discovery procedure for a plurality of communication nodes (S1910). Specifically, the first communication node may perform a discovery procedure for at least one communication node adjacent to the first communication node among the plurality of communication nodes. The discovery procedure performed at the first communication node may refer to the discovery and initial access procedure S10 described with reference to FIG. 17. Here, the first communication node may obtain a first ID of the second communication node and a sector ID including a sector index for identifying a sector of the second communication node through the discovery procedure. Also, the first communication node may further obtain at least one beam index for the second communication node through the discovery procedure. The plurality of identifiers obtained through the discovery procedure at the first communication node may refer to a plurality of identifiers described with reference to FIG. 15. That is, the second communication node may refer to the second XDU 1720 described with reference to FIG. 17.

Then, the first communication node may establish a link between the first communication node and the second communication node discovered through the discovery procedure (S1920). Specifically, the first communication node may discover the second communication node by searching for at least one communication node adjacent to the first communication node among the plurality of communication nodes. Thereafter, the first communication node may establish a link between the first communication node and the discovered second communication node. The procedure for establishing a link between the first communication node and the second communication node may refer to the link setup procedure S20 described with reference to FIG. 17. That is, the second communication node may refer to the second XDU 1720 described with reference to FIG. 17.

Thereafter, the first communication node may perform an attach procedure with third communication node that controls a plurality of communication nodes in the MXN (S1930). Specifically, the attach procedure performed at the first communication node may refer to the attach procedure S30 described with reference to FIG. 17. Here, the third communication node may be the XCU described with reference to FIG. 17. Here, when the attach procedure between the first communication node and the third communication node is completed, the state of the first communication node may be changed from the deregistered state into the registered state. Also, when the first communication node is in the registered state, the first communication node may be allocated an ID by the third communication node.

Then, the first communication node may configure a path for communications between the first communication node and a fourth communication node that has completed the attach procedure (S1940). Here, the fourth communication node may be the third XDU (1730). Specifically, the procedure for establishing a path at the first communication node may refer to the path setup procedure S40 described with reference to FIG. 17. For example, a path for communications between the first communication node and the fourth communication node may be selected by the third communication node, and the first communication node may obtain a forwarding table for the selected path.

Thereafter, the first communication node may perform communications between the first communication node and the fourth communication node using the configured path (S1950). Specifically, the procedure for performing communications between the first communication node and the fourth communication node at the first communication node may refer to the end-to-end data transmission procedure S60 described with reference to FIG. 17. For example, the first communication node may perform communications based on QoS of data transmitted from the first communication node. A specific method of performing communications at the first communication node may be described with reference to FIG. 20 below.

Figure 20:
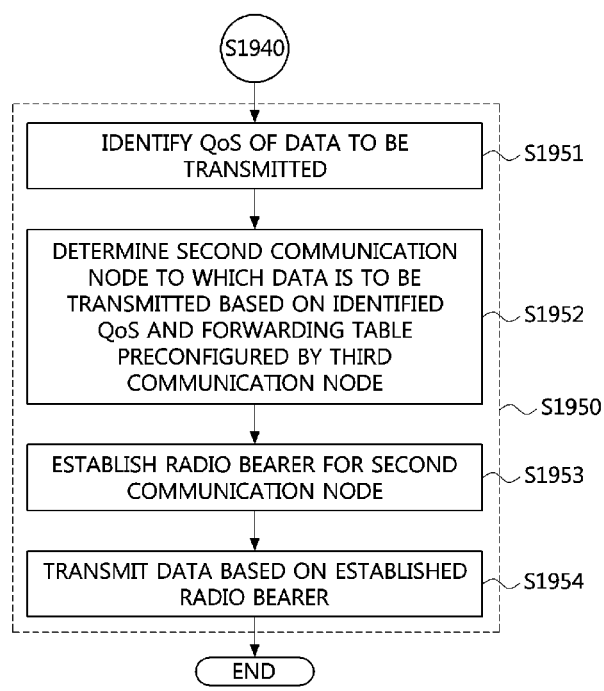
FIG. 20 is a flowchart for explaining a method of performing communications in a communication network according to another embodiment of the present disclosure.

FIG. 20 is a flowchart for explaining a method of performing communications in a communication network according to another embodiment of the present disclosure.

Referring to FIG. 20, in the MXN, the first communication node may transmit data based on QoS of the data. Specifically, the first communication node may identify the QoS of the data to be transmitted from the first communication node (S1951). For example, the first communication node may identify the QoS of the data to be transmitted from the first communication node based on the QoS characteristics described with reference to FIG. 16.

Then, the first communication node may determine the second communication node, among the plurality of communication nodes, to which the data is to be transmitted based on the identified QoS and the forwarding table preconfigured by the third communication node (S1952). That is, the third communication node may construct the forwarding table including information on at least one communication node for transmitting data in consideration of the QoS of the data, and may transmit the constructed forwarding table to the first communication node. Accordingly, the first communication node may have the forwarding table stored in advance.

Thereafter, the first communication node may establish a radio bearer for the determined second communication node (S1953). For example, the procedure for establishing the radio bearer for the second communication node at the first communication node may refer to the H2DRB setup procedures S50-1 and S50-2 described with reference to FIG. 17. Thereafter, the first communication node may transmit data based on the established radio bearer (S1954). In this way, the first communication node performing the operation method according to another embodiment of the present disclosure may transmit the data based on the QoS of the data.

Referring again to FIG. 19, the first communication node in the MXN may be connected to the third communication node through the H3 interface, and may be connected to at least one communication node connected to the first communication node through the H2 interfaces. That is, the first communication node may perform communications based on the MH3C protocol with the third communication node connected through the H3 interface. Also, the first communication node may perform communications based on the MH2C protocol with at least one communication node connected through the H2 interfaces. Specifically, the MXN may have the same structure as the reference model described with reference to FIG. 14.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a mobile xhaul network comprising a plurality of communication nodes each of which has mobility, the operation method comprising:
    performing a discovery procedure for a second communication node;
    establishing a link with the second communication node discovered through the discovery procedure;
    supporting an attach procedure between the second communication node and a third communication node performing network-wide resource management, wherein the third communication node assigns a unique ID to the second communication node through the attach procedure; and
    changing an operation mode of the first communication node from an idle mode to a master mode after establishing the link,
    wherein an operation mode of the second communication node is changed from an idle mode to a slave mode after establishing the link, a node in the master mode allocates resources to nodes in the slave mode for communications, and a node in the idle mode does not communicate with any other nodes, and
    wherein a state of the second communication node is changed from a deregistered state into a registered state when the attach procedure between the second communication node and the third communication node is completed, and the state of the second communication node is changed from an unlinked state to a linked state after establishing the link.

2. The operation method according to claim 1, wherein the first communication node obtains a first identifier of the second communication node and a sector identifier including a sector index for identifying a sector of the second communication node through the discovery procedure.

3. The operation method according to claim 2, wherein the first communication node further obtains a beam index of a beam for the second communication node through the discovery procedure.

4. The operation method according to claim 1, wherein a second identifier of the second communication node is allocated by the third communication node when the second communication node is in the registered state.

5. The operation method according to claim 1, further comprising:
    identifying quality of service (QoS) of data to be transmitted from the first communication node;
    determining a destination communication node to which the data is to be transmitted among the plurality of communication nodes based on the identified QoS and a forwarding table preconfigured by the third communication node;
    establishing a radio bearer for the determined destination communication node; and
    transmitting the data through the established radio bearer.

6. The operation method according to claim 1, wherein the second communication node is connected to the third communication node through an H3 interface, and connected to the first communication node through an H2 interface.

7. The operation method according to claim 6, wherein the second communication node performs communications with the third communication node based on an MXN H3 control (MH3C) protocol.

8. The operation method according to claim 6, wherein the second communication node performs communications with the first communication node based on an MXN H2 control (MH2C) protocol.

9. An operation method of a first communication node in a mobile xhaul network comprising a plurality of communication nodes each of which has mobility, the operation method comprising:
    allowing the first communication node to be discovered by a second communication node through a discovery procedure;
    establishing a link with the second communication node discovering the first communication node;
    performing an attach procedure with a third communication node performing network-wide resource management under support of the second communication node, wherein the third communication node assigns a unique ID to the first communication node through the attach procedure; and
    changing an operation mode of the first communication node from an idle mode to a slave mode after establishing the link,
    wherein an operation mode of the first communication node is changed from an idle mode to a master mode after establishing the link, a node in the master mode allocates resources to nodes in the slave mode for communications, and a node in the idle mode does not communicate with any other nodes, and wherein a state of the first communication node is changed from a deregistered state into a registered state when the attach procedure between the first communication node and the third communication node is completed, and the state of the first communication node is changed from an unlinked state to a linked state after establishing the link.

10. The operation method according to claim 9, wherein the second communication node obtains a first identifier of the first communication node and a sector identifier including a sector index for identifying a sector of the first communication node through the discovery procedure.

11. The operation method according to claim 10, wherein the second communication node further obtains a beam index of a beam for the first communication node through the discovery procedure.

12. The operation method according to claim 9, wherein a second identifier of the first communication node is allocated by the third communication node when the first communication node is in the registered state.

13. The operation method according to claim 9, further comprising:

identifying quality of service (QoS) of data to be transmitted from the first communication node;

determining a destination communication node to which the data is to be transmitted among the plurality of communication nodes based on the identified QoS and a forwarding table preconfigured by the third communication node;

establishing a radio bearer for the determined destination communication node; and transmitting the data through the established radio bearer.

14. The operation method according to claim 9, wherein the first communication node is connected to the third communication node through an H3 interface, and connected to the second communication node through an H2 interface.

15. The operation method according to claim 14, wherein the first communication node performs communications with the third communication node based on an MXN H3 control (MH3C) protocol.

16. The operation method according to claim 14, wherein the first communication node performs communications with the second communication node based on an MXN H2 control (MH2C) protocol.

* * * * *